(12) United States Patent
Ko et al.

(10) Patent No.: US 7,675,719 B2
(45) Date of Patent: Mar. 9, 2010

(54) CURRENT LIMITING MODULE AND HYBRID CURRENT LIMITER USING DIFFERENT KINDS OF SUPERCONDUCTING WIRES

(75) Inventors: Tae-Kuk Ko, Seoul (KR); Dong-Keun Park, Seoul (KR); Seong-Eun Yang, Seoul (KR); Young-Jae Kim, Seoul (KR); Ki-Sung Chang, Seoul (KR); Min-Cheol Ahn, Seoul (KR); Bok-Yeol Seok, Yongin-shi (KR)

(73) Assignee: Industry-Academic Corporation Foundation, Yonsie University, Seoul (KR)

( * ) Notice: Subject to any disclaimer, the term of this patent is extended or adjusted under 35 U.S.C. 154(b) by 76 days.

(21) Appl. No.: 12/036,965

(22) Filed: Feb. 25, 2008

(65) Prior Publication Data

US 2009/0190274 A1 Jul. 30, 2009

(30) Foreign Application Priority Data

Jan. 30, 2008 (KR) .................. 10-2008-0009615

(51) Int. Cl.
*H02H 7/00* (2006.01)
(52) U.S. Cl. ..................................... 361/19
(58) Field of Classification Search ............. 361/19
See application file for complete search history.

(56) References Cited

U.S. PATENT DOCUMENTS

| 6,275,365 | B1 * | 8/2001 | Kalsi et al. | 361/19 |
| 6,337,785 | B1 * | 1/2002 | Okazaki | 361/19 |
| 2006/0268471 | A1 * | 11/2006 | Lee et al. | 361/19 |

* cited by examiner

*Primary Examiner*—Stephen W Jackson
*Assistant Examiner*—Angela Brooks

(57) ABSTRACT

The present invention provides a current limiting module and a hybrid current limiter using different kinds of superconducting wires. The current limiting module includes a first superconducting wire that is wound in a predetermined direction, and a second superconducting wire that has quench characteristic different from the first superconducting wire and is wound to generate magnetic flux in a direction opposite to magnetic flux induced by the first superconducting wire. According to the present invention, inductance is generated due to unequal supply of fault current. Therefore, it is possible to prevent current from being suddenly increased, and to reduce the number of superconducting wires required to manufacture the current limiting module. Further, the hybrid current limiter does not need to include a separate coil for operating a fast switch.

10 Claims, 8 Drawing Sheets

[Fig. 1A]
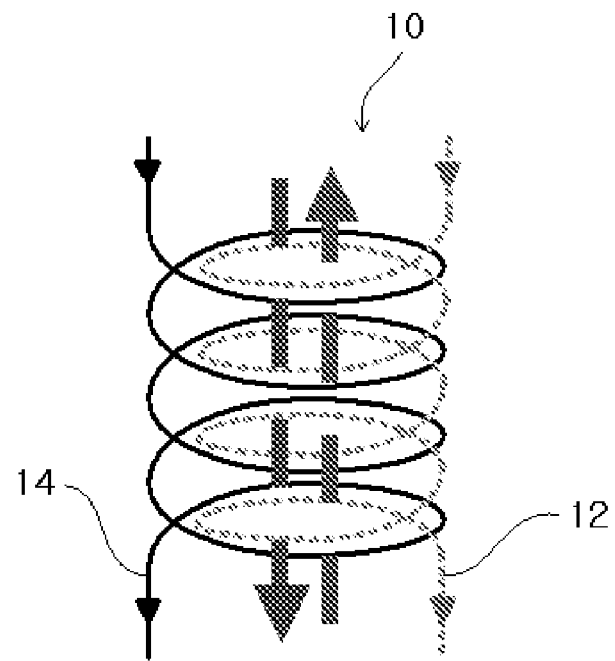
[Fig. 1B]
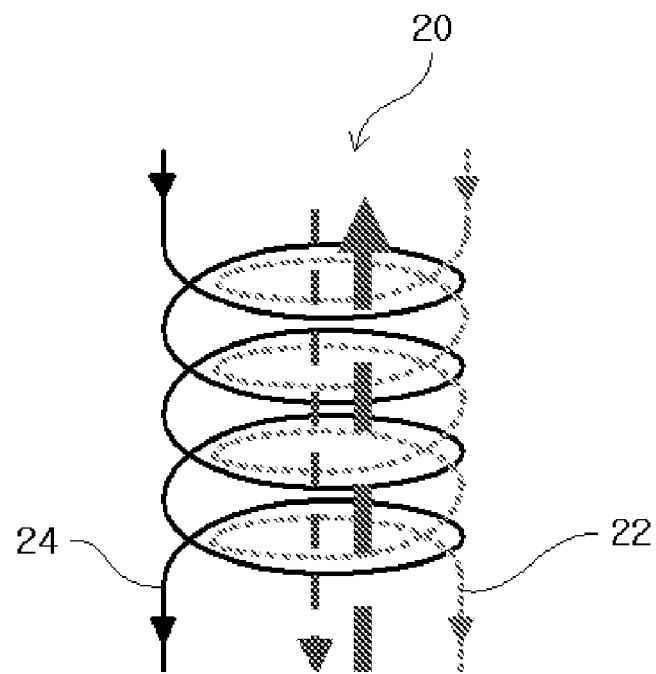

[Fig. 2A]
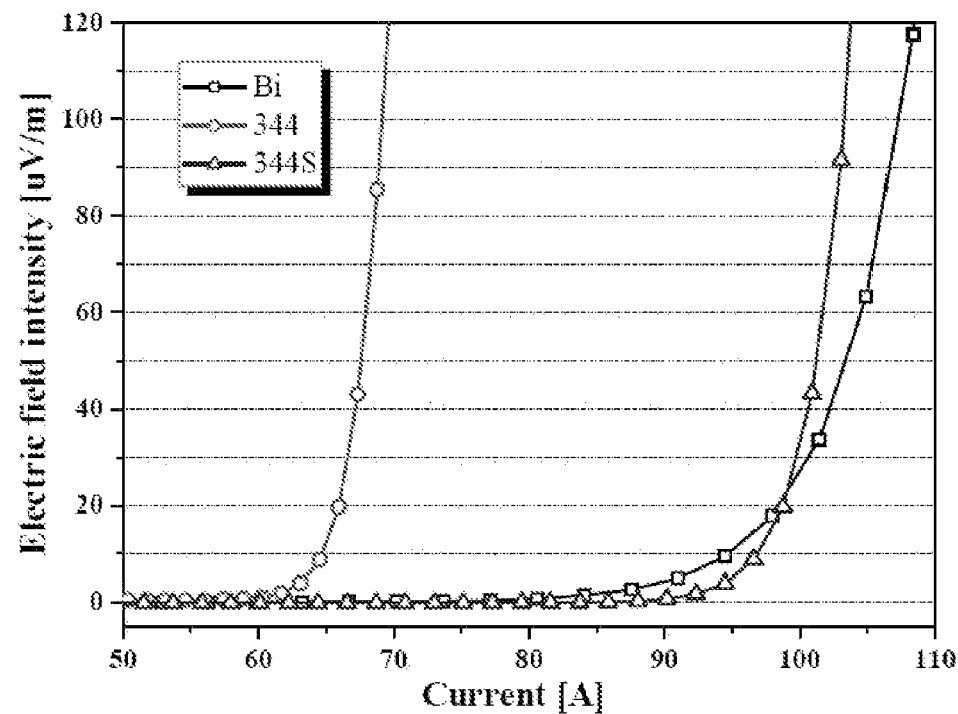
[Fig. 2B]
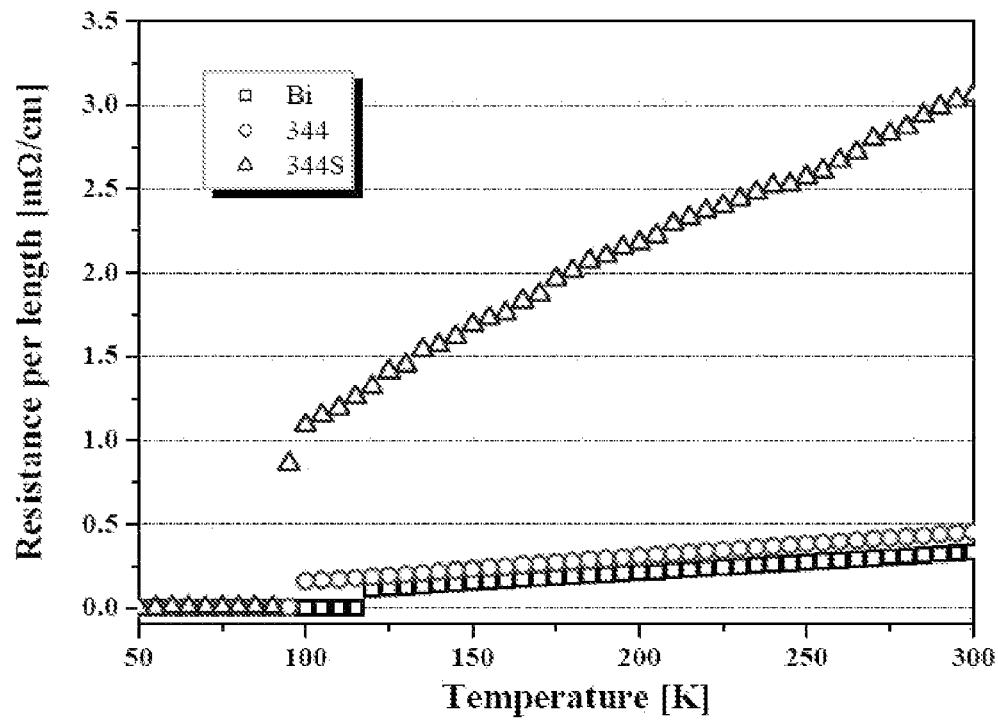

[Fig. 3A]
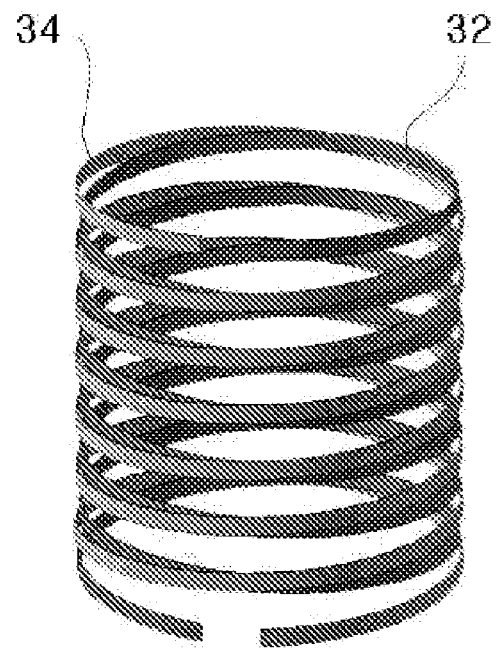
[Fig. 3B]
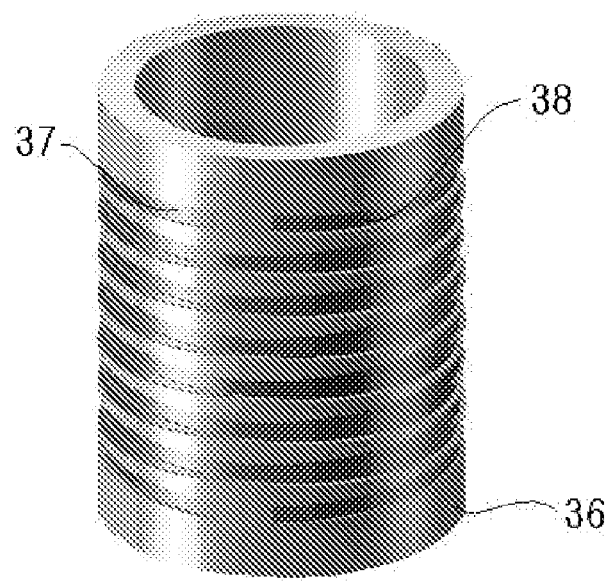

[Fig. 4]
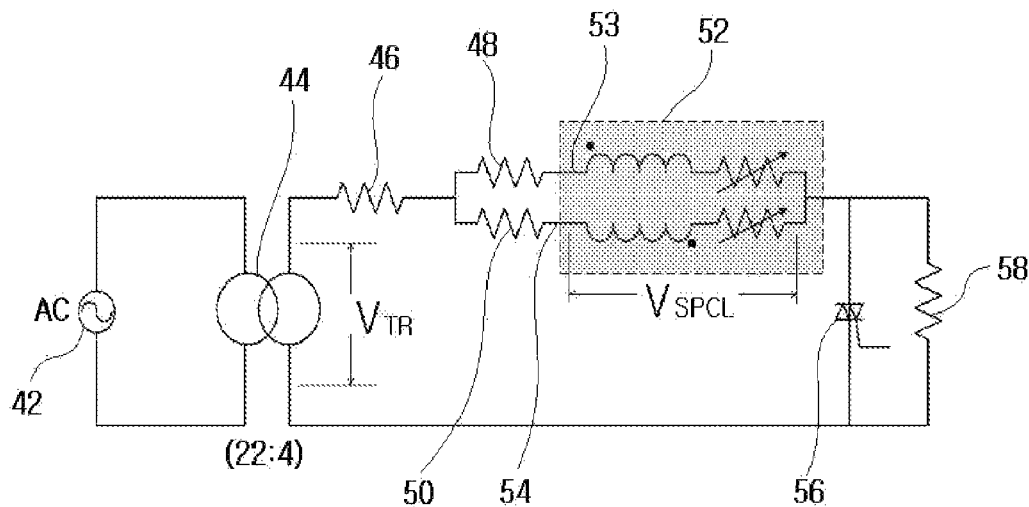
[Fig. 5A]
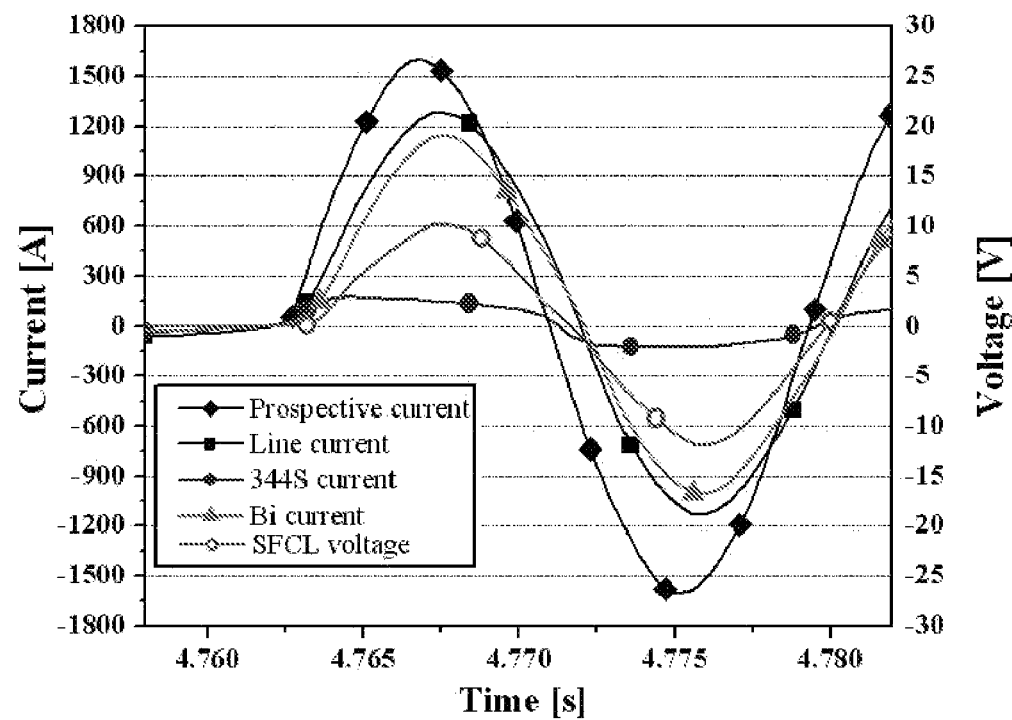

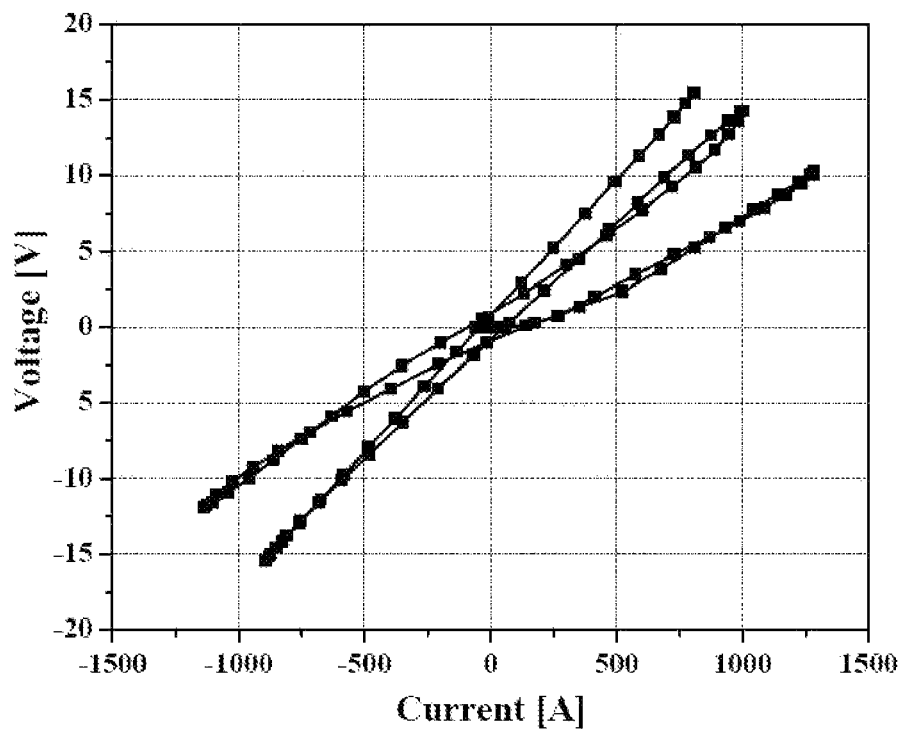
[Fig. 5B]
[Fig. 5C]
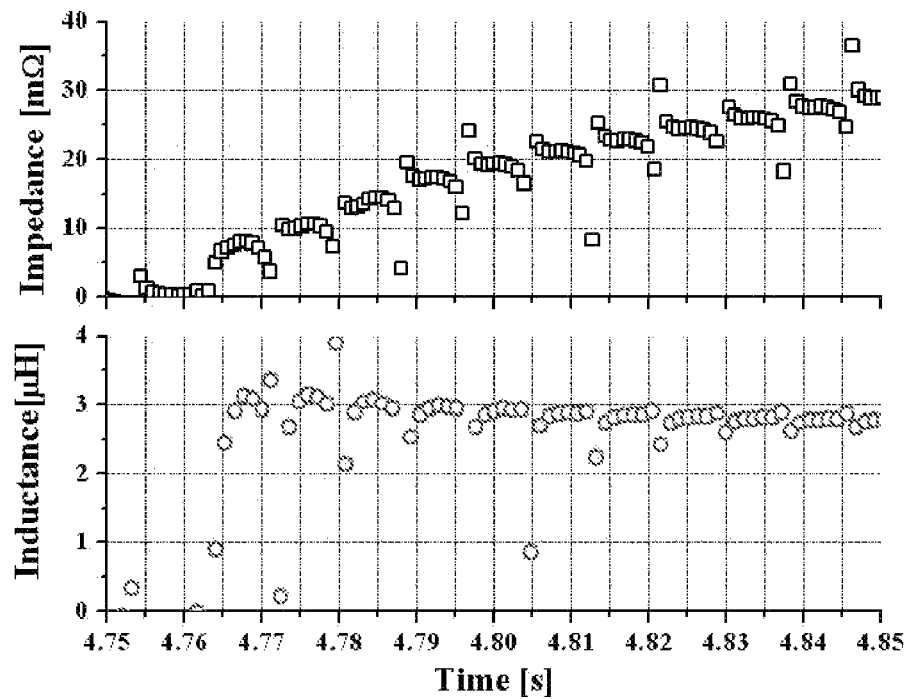

[Fig. 6A]
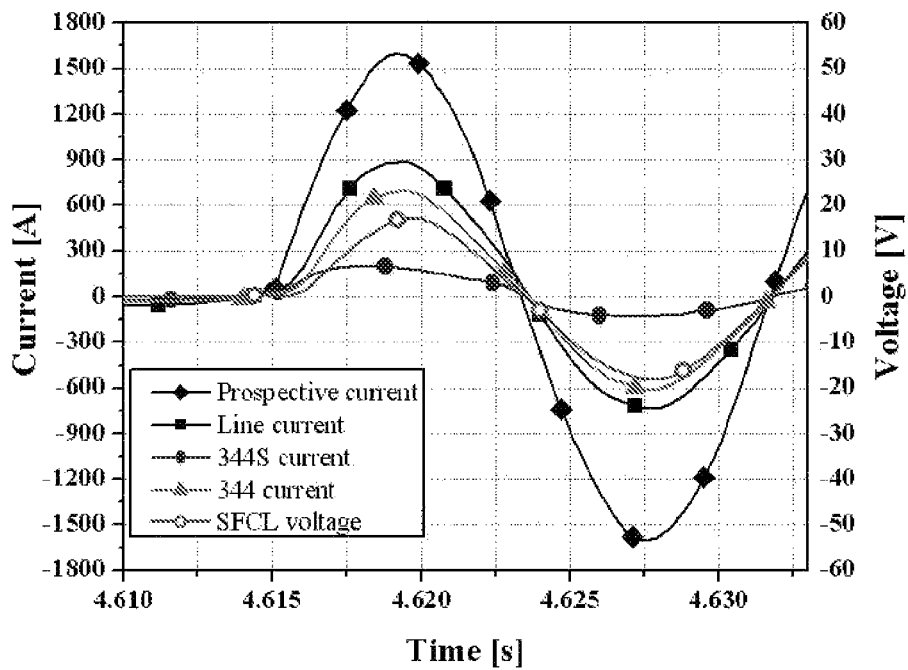
[Fig. 6B]
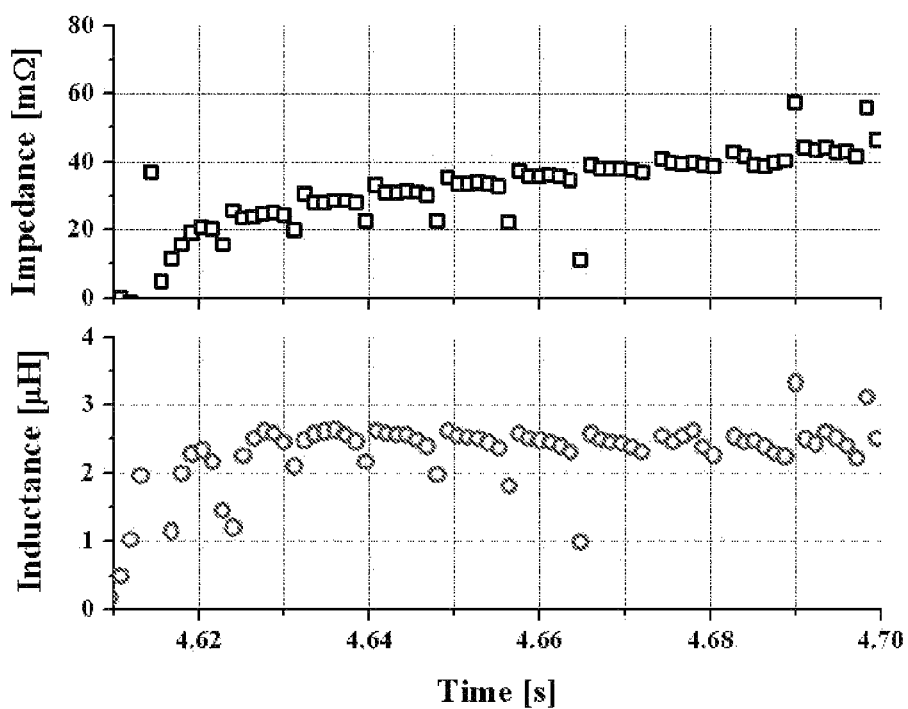

[Fig. 7A]
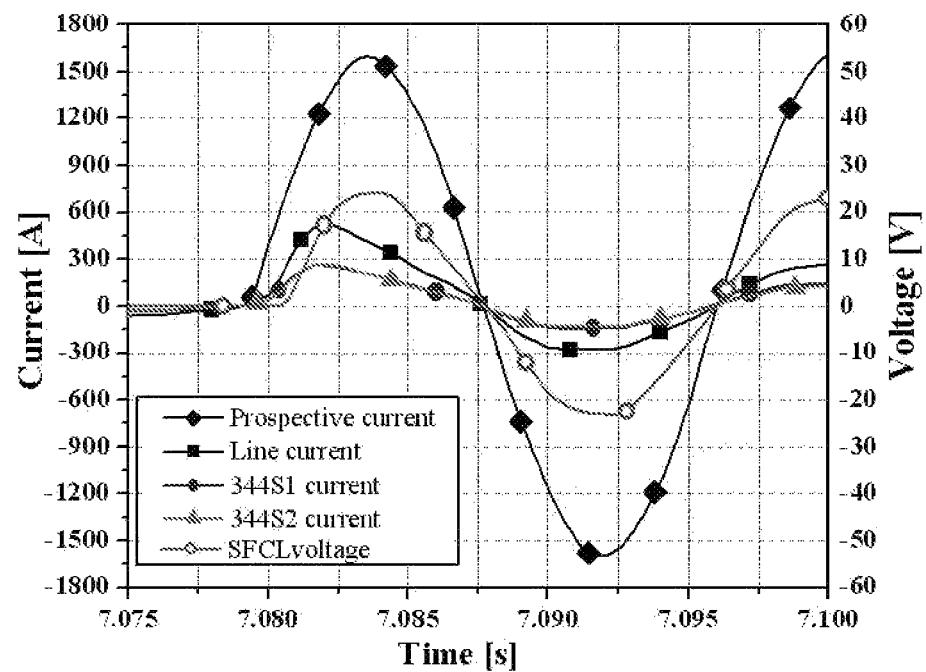
[Fig. 7B]
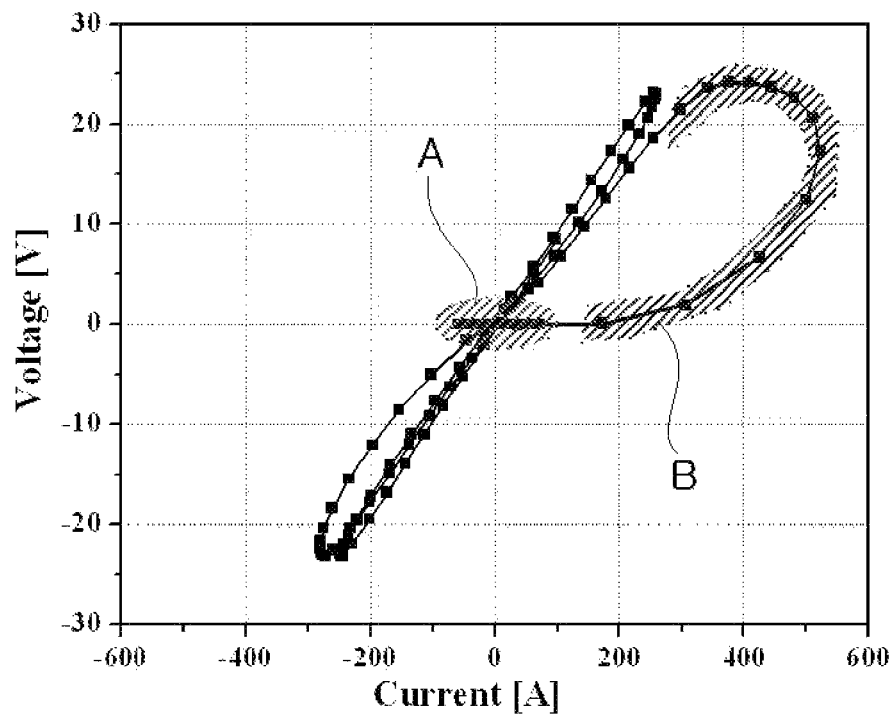

[Fig. 8]
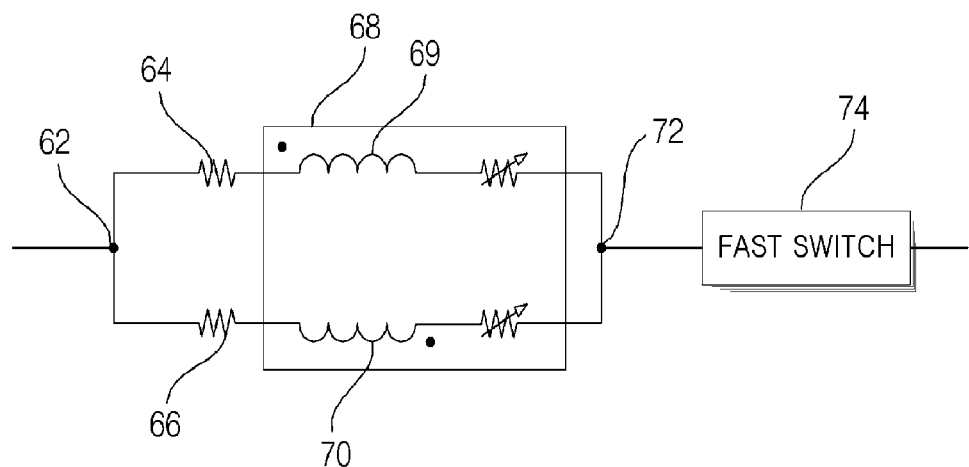

CURRENT LIMITING MODULE AND HYBRID CURRENT LIMITER USING DIFFERENT KINDS OF SUPERCONDUCTING WIRES

BACKGROUND OF THE INVENTION

1. Field of the Invention

The present invention relates to a current limiting module and a hybrid current limiter using different kinds of superconducting wires. In particular, the present invention relates to a current limiting module and a hybrid current limiter that hardly generate resistance in a normal current state and generate high resistance in a fault current in order to limit current. When large fault current is generated in an electric power system, such as a power transmission line, a motor, and a generator that transmits large current, the current limiting module and the hybrid current limiter may be used to limit current.

2. Description of the Related Art

Superconducting current limiters, which limit large fault current generated in a system, may be generally classified into a resistive superconducting current limiter and an inductive superconducting current limiter. The inductive current limiter generally limits impedance by using an inductance component as impedance, and the resistive current limiter generally limits current by using a resistance component as impedance. Further, a non-inductive winding type current limiter is a resistive current limiter. If fault current exceeds the critical current of the superconducting current limiter, the non-inductive winding type current limiter generates resistance through the phase shift of a superconductor, and limits fault current by using the resistance as impedance. In the related art, a non-inductive winding type current limiter employs HTS (high temperature superconducting) wires. As for the non-inductive winding type current limiter, impedance is zero in a normal current state, impedance is generated after fault, and the impedance is adjusted to zero after the completion of the fault.

Since normal current flows in the non-inductive winding type current limiter during most of time, the impedance of the non-inductive winding type current limiter needs to be minimized. Even when the resistance of the current limiter is zero, the structure in which superconducting lines are wound generates inductance. There are a bifilar winding, a series type non-inductive coil, and a parallel type non-inductive coil as the structure for minimizing the inductance generated as described above. Among them, the parallel type structure includes two wires that are wound adjacent to each other, and has advantages in terms of electrical insulation and thermal stability. A coil having a parallel type structure has small impedance that is caused by an AC component of current in a normal state, and large resistive impedance that is caused by current quench in a fault state. In the parallel type structure in the related art, the magnetic flux generated from two wires has the same intensity and different direction. For this reason, inductance components are offset to each other, and the impedance caused by current in a fault state has only a resistance component.

A superconducting material is a material that causes superconductivity in ranges lower than critical temperature, critical current density, and critical magnetic field. In general, the superconducting material is manufactured in the form of a wire, a thin film, bulk, and the like. In particular, since having zero impedance in a normal state, a superconducting wire is used to transmit large current without loss or to generate ferromagnetism. Since a fault current limiter using the superconducting material should have zero impedance in a normal current state, non-inductive coils may be applied to the fault current limiter.

Korean Patent Publication No. 2001-122194 discloses the following current limiter. In the current limiter, an inner bobbin is provided in an outer bobbin, and the outer bobbin is provided with superconducting modules where wires are wound in opposite directions so as to be connected to each other through current terminals in parallel. Further, the modules are formed by a connecting member so as to be symmetrical with each other in a vertical direction. Since the magnetic fields of the current limiter are offset to each other, the current limiter does not generate an inductance component. Further, since generating only a resistance component depending on the intensity of fault current, the current limiter has a limitation that current cannot be limited by inductance in a fault state.

SUMMARY OF THE INVENTION

An object of the present invention is to provide a current limiting module having the structure in which different kinds of superconducting wires having different quench characteristics are wound in opposite directions. While the current limiting module maintains zero impedance characteristic in a normal state and resistance caused by the supply of fault current, the current limiting module generates inductance due to the unequal supply of fault current and prevents current from being suddenly increased by the generated inductance. Further, the number of superconducting wires of the current limiting module can be reduced. In addition, another object of the present invention is to provide a hybrid current limiter capable of operating a fast switch by a magnetic field that is generated from the current limiting module due to the supply of fault current.

An embodiment of the present invention provides a current limiting module. The current limiting module includes a first superconducting wire that is wound in a predetermined direction, and a second superconducting wire that has quench characteristic different from the first superconducting wire and is wound to generate magnetic flux in a direction opposite to magnetic flux induced by the first superconducting wire.

In the current limiting module, the first superconducting wire may be provided inside or outside the second superconducting wire so as to be spaced apart from the second superconducting wire by a predetermined distance and parallel to the second superconducting wire. Further, resistance characteristics or n-values of the first and second superconducting wires, which are generated during quench, may be different from each other. The impedance of the current limiting module is about zero in a normal current range. However, when current that exceeds predetermined critical current is supplied to the current limiting module, resistance and inductance are generated so as to correspond to difference of quench characteristics.

The current limiting module may include a superconducting wire of which n-value and resistance are larger than a predetermined reference value as the first superconducting wire, and a superconducting wire of which n-value and resistance are smaller than a predetermined reference value as the second superconducting wire. In particular, the first superconducting wire may include a BSCCO superconducting material and silver as a matrix material, and the second superconducting wire may include an YBCO superconducting material and a copper or stainless steel ingredient as a resistive matrix material.

Another embodiment of the present invention provides a hybrid current limiter. The hybrid current limiter includes a first superconducting wire that is wound in a predetermined direction, a second superconducting wire that has quench characteristic different from the first superconducting wire and is wound to generate magnetic flux in a direction opposite to magnetic flux induced by the first superconducting wire, and a switch that is connected to one end of each of the first and second superconducting wires and turned on/off by a magnetic field generated from the first and second superconducting wires.

The hybrid current limiter may further include a first shunt resistor that is connected to the first superconducting wire in series, a second shunt resistor that is connected to the second superconducting wire in series, a first node that is connected to one end of a first line and one end of a second line, and a second node that is connected to the other end of the first line and the other end of the second line. The first line is formed by the first shunt resistor and the first superconducting wire, and the second line is formed by the second shunt resistor and the second superconducting wire.

According to the present invention, the current limiting module employs the structure in which different kinds of superconducting wires having different quench characteristics are wound in opposite directions. Accordingly, while the current limiting module maintains a zero impedance characteristic in a normal state and a current suppressing characteristic occurring when fault current is supplied are maintained, the current limiting module generates inductance due to the unequal supply of fault current, thereby preventing current from being suddenly increased. Further, when fault current is supplied, the current limiting module according to the present invention has a higher impedance generating rate in comparison with a resistive current limiting module in the related art. Further, it is possible to reduce the number of superconducting wires that are required to manufacture the current limiting module. Further, when the current limiting module according to the present invention and a fast switch are connected to each other in series, it is possible to perform a fast switching operation by using a magnetic field generated from the current limiting module, as fault current is supplied. As a result, a separate coil for operating the fast switch does not need to be provided.

BRIEF DESCRIPTION OF THE DRAWINGS

FIG. 1A is a view showing an example of a current limiting module using an existing single superconducting wire;

FIG. 1B is a view showing a current limiting module using different kinds of superconducting wires according to an embodiment of the present invention;

FIG. 2A is a graph showing a relationship between electric field intensity and current in respect to materials of the superconducting wires;

FIG. 2B is a graph showing resistance per unit length with respect to temperature;

FIGS. 3A and 3B are view showing the structure a current limiting module according to another embodiment of the present invention;

FIG. 4 is a circuit diagram of a circuit that is used for a short-circuit test of the current limiting module according to the embodiment of the present invention;

FIGS. 5A to 5C are graphs showing current and impedance characteristics of a current limiting module according to another embodiment of the present invention;

FIGS. 6A and 6B are graphs showing current and impedance characteristics of a current limiting module according to another embodiment of the present invention;

FIGS. 7A and 7B are showing current and impedance characteristics of a current limiting module in the related art; and FIG. 8 is a view showing the configuration of a hybrid current limiter according to another embodiment of the present invention.

DESCRIPTION OF THE PREFERRED EMBODIMENTS

A current limiting module and a hybrid current limiter according to embodiments of the present invention will be described in detail below with reference to accompanying drawings.

FIG. 1A is a view showing a current limiting module using an existing single superconducting wire, and FIG. 1B is a view showing a current limiting module using different kinds of superconducting wires according to an embodiment of the present invention. A current limiting module 10 shown in FIG. 1A includes a first superconducting wire 12 that is wound inside, and a second superconducting wire 14 that is wound outside. A current limiting module 20 shown in FIG. 1B includes first and second superconducting wires 22 and 24. The quench characteristic of the second superconducting wire 24 is different from that of the first superconducting wire 22, and is wound to generate magnetic flux in a direction opposite to magnetic flux induced by the first superconducting wire.

The current limiting module 10 shown in FIG. 1A is a parallel type coil in which the same two superconducting wires are wound in opposite directions so as to be spaced apart from each other by a predetermined distance. The same two superconducting wires of the current limiting module 10 shown in FIG. 1A have zero impedance in a normal current state. Since the superconducting wires are wound in clockwise or counterclockwise direction so as to alternate, inductances generated by the wound superconducting wires are offset to each other. When fault occurs in a circuit and large current is suddenly supplied to each of the superconducting wires of the current limiting module 10, the same resistive impedance is generated in both wires. Accordingly, the current supplied to both wires are maintained equal to each other.

The current limiting module 20 shown in FIG. 1B is a parallel type coil in which different kinds of two superconducting wires are wound. Since the quench characteristics of the superconducting wires of the current limiting module are different from each other, fault current to be supplied are differently distributed depending on the quench characteristics of the wires. In this case, "the quench characteristics are different from each other" means, for example, that resistance characteristics, index numbers such as n-values, resistance generating rates and the like to be generated during quench are different from each other. In particular, it is preferable that the n-value of the first superconducting wire be 30 or more and the n-value of the second superconducting wire be 20 or less. The reason for this is that larger different between the n-values of the superconducting wires may cause larger inductance.

FIG. 2A is a graph showing a relationship between electric field intensity and current in respect to materials of the superconducting wires, and FIG. 2A is a graph showing resistance per unit length with respect to temperature. The relationship between the current density and electric field intensity of current flowing through the superconducting wires may be defined by Equation 1.

$$E = E_c (J/J_c)^n \quad \text{[Equation 1]}$$

where, E is electric field intensity, $E_c$ is electric field intensity in a superconducting state, J is current density, $J_c$ is current in a superconducting state, and n is an n-value.

As shown in FIGS. 2A and 2b, the impedance of a material of the superconducting wire is about zero in a normal current range. However, if quench occurs, the characteristics thereof such as an n-value and resistance vary depending on the current intensity. When fault occurs in a circuit, difference of quench characteristics between the kinds of the superconducting wires causes different current distribution. Due to difference of current flowing through the superconducting wires, magnetic flux that is generated by the wires wound in different directions is not completely offset from each other, and residual magnetic flux remains. "Residual magnetic flux is generated due to the difference of quench characteristics" means that inductance is generated by the fault current of the current limiting module 20.

The superconducting wire of the current limiting module according to the embodiment of the present invention may be preferably a HTS (high temperature superconducting) wire, such as a BSCCO superconducting wire or an YBCO superconducting wire. For example, there are a Bi2223 tape, a copper-stabilized Y123 coated conductor, a stainless steel-stabilized coated conductor, and the like. In particular, a superconducting wire, which includes a BSCCO superconducting material and a silver ingredient as a matrix, may be preferably used as the first superconducting wire, and a superconducting wire, which includes an YBCO superconducting material and copper or stainless steel ingredient as a matrix, may be preferably used as the second superconducting wire.

FIGS. 3A and 3B are view showing the structure a current limiting module according to another embodiment of the present invention. FIG. 3A shows first and second superconducting wires 32 and 34 of the current limiting module, and FIG. 3B shows a bobbin 36 on which the two superconducting wires are wound. As shown in FIG. 3A, the first superconducting wire 32 is arranged inside the second superconducting wire 34 so as to be spaced apart from the second superconducting wire by a predetermined distance and parallel to the second superconducting wire. When current that exceeds predetermined critical current is supplied to the first and second superconducting wires, the first and second superconducting wires generate inductance as well as resistance due to difference of quench characteristics therebetween. The bobbin 36 a first groove 37 and a second groove 38. The first superconducting wire 32 is wound in the first groove 37 in a clockwise direction. The second groove 38 is spaced apart from the first groove 37 inside the first groove 37, and the second superconducting wire 34 is wound in the second groove 38 in a counterclockwise direction.

FIG. 4 is a circuit diagram of a circuit that is used for a short-circuit test of the current limiting module according to the embodiment of the present invention. The circuit shown in FIG. 4 includes an AC power source 42, a transformer 44, a first shunt resistor 46, a second shunt resistor 48, a third shunt resistor 50, a current limiting module 52, a S/W (TRIAC) 56, and a load resistor 58. Two shunt resistors 48 and 50, which are used to measure current flowing through each of the superconducting wires, are connected to a $LN_2$ bath. The second and third shunt resistors 48 and 50 are provided to equally distribute current supplied to each of the superconducting wires in a normal current state. Further, the resistance of the second and third shunt resistors is small in comparison with resistance generated by the superconducting wires. Accordingly, power loss caused by the shunt resistors does not matter. The current limiting module 52 includes two superconducting wires 53 and 54, and the S/W (TRIAC, 56) is a switching semiconductor that causes a fault by a short circuit. Table 1 shows specifications of a current limiting module that is an object to be tested.

TABLE 1

| Name | Bi | 344 | 344S |
|---|---|---|---|
| HTS | BSCCO2223 | YBCO123 | YBCO123 |
| Matrix | Ag | Copper-alloy | Stainless steel |
| Width | 4.1 mm | 4.4 mm | 4.4 mm |
| $I_c$ | 107.2 A | 69.1 A | 103.3 A |
| n-value | 18.3 | 35.7 | 35.3 |

FIGS. 5A to 5C are graphs showing current and impedance characteristics of a current limiting module according to another embodiment of the present invention. A 344S wire and a Bi wire are used as superconducting wires of the current limiting module (coil 1) according to this embodiment. Since the resistance of the 344S wire is quite different from that of the Bi wire, difference of the values of current supplied to the superconducting wires is large, so that larger inductance is generated. FIG. 5A shows a relationship between current and a voltage in the coil 1. From the graph of FIG. 5A, it is possible to understand that the phase of a voltage curve is different from that of a current curve. This means that inductance is generated. From an impedance curve of FIG. 5B, it is possible to also understand that the phase of a voltage is different from that of current. In FIG. 5B, the slope of the impedance curve means the impedance. Before the fault, the impedance of the superconducting wire is zero. However, when fault occurs, the impedance curve is deviated from the origin point and has a predetermined slope (impedance). The impedance curve shown in FIG. 5B does not pass through the origin point after the fault. The reason for this is that phase difference occurs between a voltage and current due to the generated inductance. The inductance can be calculated by Equation 2.

$$L = \left( \frac{I_{large} - I_{small}}{I_{line}} \right) \times L_S \quad \text{[Equation 2]}$$

where, $I_{large}$ indicates larger current between current flowing through two superconducting wires, $I_{small}$ indicates smaller current therebetween, $I_{line}$ indicates line current, and $L_s$ indicates the inductance of a single wire.

FIG. 5C is a graph showing a relationship between total impedance and inductance of the coil 1 and time. After the fault, total impedance is 6 mΩ, and inductance is 2.9 µH that corresponds to 1.09 mΩ. Even if total impedance of the coil 1 is getting larger after the fault, the inductance is almost constant because current flowing through two wires is almost constant. The main reason why the coil 1 causes inductance is that the resistances of the superconducting wires are different from each other.

FIGS. 6A and 6B are graphs showing current and impedance characteristics of a current limiting module according to another embodiment of the present invention. A 344S wire and a 344 wire are used as superconducting wires of the current limiting module (coil 2) according to this embodiment. Even though a critical current of the 344 superconducting wire is 69 A, it takes about 1 ms to activate quench after the fault. After the quench, about 80% of line current flows through the 344 superconducting wire. Total impedance depends on the resistance of the 344 superconducting wire. The inductance of the coil 2 is generated due to the difference of current distribution between 344S and 344 wires. Since whole current flows through any one wire, the maximum inductance is supposed to be 4 μH that is equal to the inductance of the single wire.

FIG. 6A is a graph showing a relationship between a voltage and current in the coil 2. FIG. 6B is a graph showing a relationship between impedance and inductance of the coil 2 and time after the fault. The measured inductance is 2.6 μH that corresponds to 0.98 mΩ. Since the impedance is increased from 20Ω to 40Ω, most of the impedance is resistance. Since the 344S and 344 superconducting wires of the coil 2 are YBCO CC and each have a large n-value of about 35, the inductance was immediately generated at the moment of 4.615 s after the fault.

FIGS. 7A and 7B are showing current and impedance characteristics of a current limiting module in the related art. A 344S wire is used as a superconducting wire of the current limiting module (coil 3) of this comparative example. In FIG. 7A, the prospective current is fault current when a current limiting module is not provided, and is about 1600 A. Since the same superconducting wires are wound in the coil 3, currents flowing in inner and outer wires are substantially equal to each other. A $V_{SFCL}$ before the fault is zero, and abruptly increased after the fault. When current flowing through the superconducting wire is larger than a critical current of 103 A, a $V_{SFCL}$ is also increased. It takes about 1 ms to occur a quench from the fault on.

In FIG. 7B, the slope of the graph represents the impedance of the superconducting wire. Region A of FIG. 7B corresponds to a normal current state, and the impedance of the superconducting wire is zero in the normal current state. When fault occurs, impedance is moved to Region B. It is possible to understand that the impedance of the coil 3 is gently increased in comparison with that of the coil 1 and the phase is not changed, so that the impedance curve passes through the origin point.

The coil 3 has the largest impedance among three coils. However, there is no magnetic field in the coil 3. In contrast, the coil 1 has a magnetic field higher in comparison with the coil 2. However, since total impedance of coil 1 is smallest because the resistance of Bi is small. The coil 2 is also embodied according to the present invention. However, since the wire used in this test is short, it is not easy to distinguish the inductive component from total impedance. Resistance is proportional to the length of the superconducting wire, but the inductance of the coil is proportional to the square of the length of the superconducting wire. Considering this, if longer superconducting wires are wound unlike in this test, it is possible to significantly increase inductance.

FIG. 8 is a view showing the configuration of a hybrid current limiter according to another embodiment of the present invention. The hybrid current limiter shown in FIG. 8 includes a first node 62, a first shunt resistor 64, a second shunt resistor 66, a current limiting module 68, a second node 72, and a fast switch 74. The two shunt resistors 64 and 66 distribute current, which is supplied to first and second superconducting wires 69 and 70 of the current limiting module 68, at a ratio between the shunt resistors.

The inductance of the current limiting module, which includes different kinds of superconducting wires, according to the present invention is about zero in a normal state. However, in a fault state, inductance is not offset and remains between the superconducting wires due to the unequal current distribution that is caused by the difference of quench characteristics. Accordingly, A magnetic field, which is caused by the residual inductance, is generated in the current limiting module 68. Further, the fast switch can be turned on/off by the magnetic field. The hybrid current limiter in the related art does need to include a separate coil in order to generate a magnetic field, which is used to operate the fast switch. However, since the hybrid current limiter according to the present invention quickly generates impedance after the fault. Therefore, the hybrid current limiter according to the present invention is suitable for fast switching.

The current limiting module according to the present invention prevents current from being suddenly increased, effectively prevents large current from being supplied to a circuit in early fault, and can reduce the number of required superconducting wires, by using inductance that is generated due to unequal supply of fault current. For this reason, the current limiting module is suitable to be used in the application of electric power system, such as a power transmission line and a generator. Further, a hybrid current limiter, in which the current limiting module according to the present invention is connected to a fast switch in series, can perform a fast switching operation by using a magnetic field of the current limiting module, as fault current is supplied thereto.

What is claimed is:

1. A current limiting module comprising:
   a first superconducting wire including a BSCCO superconducting material and silver as a resistive matrix ingredient configured to be wound in a predetermined direction; and
   a second superconducting wire including an YBCO superconducting material and copper or stainless steel ingredient as a resistive matrix ingredient having a different quench characteristic from the first superconducting wire configured to be wound to generate magnetic flux in a direction opposite to magnetic flux induced by the first superconducting wire.

2. The current limiting module of claim 1, wherein resistance characteristics or n-values of the first and second superconducting wires, which are generated during quench, are different from each other.

3. The current limiting module of claim 1, wherein the first superconducting wire is provided inside or outside the second superconducting wire so as to be spaced apart from the second superconducting wire by a predetermined distance and parallel to the second superconducting wire, and when current that exceeds predetermined critical current is supplied to the first and second superconducting wires, the first and second superconducting wires generate inductance corresponding to difference of quench characteristics there between.

4. The current limiting module of claim 1, further comprising:
   a bobbin including a first groove in which the first superconducting wire is wound in a first direction, and a second groove in which the second superconducting wire is wound in a second direction, the second groove being spaced apart from the first groove inside or outside the first groove so as to be parallel to the first groove.

5. The current limiting module of claim 1, wherein an n-value and resistance of the first superconducting wire are larger than a predetermined reference value, an n-value and resistance of the second superconducting wire are smaller than a predetermined reference value, and the first and second superconducting wires are arranged parallel to each other.

6. The current limiting module of claim 5, wherein the n-value of the first superconducting wire is 30 or more, and the n-value of the second superconducting wire is 20 or less.

7. A hybrid current limiter comprising:
a first superconducting wire including a BSCCO superconducting material and silver as a resistive matrix ingredient configured to be wound in a predetermined direction;
a second superconducting wire including an YBCO superconducting material and copper or stainless steel ingredient as a resistive matrix ingredient having a different quench characteristic from the first superconducting wire configured to be wound to generate magnetic flux in a direction opposite to magnetic flux induced by the first superconducting wire; and
a fast switch that is connected to one end of each of the first and second superconducting wires and turned on/off by a magnetic field generated from the first and second superconducting wires.

8. The hybrid current limiter of claim 7, wherein resistance characteristics or n-values of the first and second superconducting wires, which are generated during quench, are different from each other.

9. The hybrid current limiter of claim 7, further comprising:
a first shunt resistor that is connected to the first superconducting wire in series;
a second shunt resistor that is connected to the second superconducting wire in series;
a first node that is connected to one end of a first line and one end of a second line, the first line being formed by the first shunt resistor and the first superconducting wire, the second line being formed by the second shunt resistor and the second superconducting wire; and
a second node that is connected to the other end of the first line and the other end of the second line.

10. The hybrid current limiter of claim 7, further comprising:
a bobbin including a first groove in which the first superconducting wire is wound in a first direction, and a second groove in which the second superconducting wire is wound in a second direction, the second groove being spaced apart from the first groove inside or outside the first groove so as to be parallel to the first groove.

* * * * *